United States Patent [19]

Wolfs et al.

[11] Patent Number: 4,998,460

[45] Date of Patent: Mar. 12, 1991

[54] PISTON ENGINE

[75] Inventors: Marc J. M. Wolfs; Andreas J. Garenfeld, both of Eindhoven, Netherlands

[73] Assignee: U.S. Philips Corporation, New York, N.Y.

[21] Appl. No.: 358,318

[22] Filed: May 26, 1989

[30] Foreign Application Priority Data

Nov. 14, 1988 [NL] Netherlands .......... 8802786

[51] Int. Cl.$^5$ ............................................ F01B 31/00
[52] U.S. Cl. ............................ 92/162 R; 92/DIG. 1; 92/DIG. 2; 92/169.1; 60/517; 60/518; 60/519; 60/520
[58] Field of Search ............ 92/61, 5, 162 R, DIG. 1, 92/DIG. 2, 169.1, 170.1; 60/517, 518, 519, 520, 521, 525; 62/6; 417/350, 417, 418

[56] References Cited

U.S. PATENT DOCUMENTS

| | | | |
|---|---|---|---|
| 3,777,621 | 12/1973 | Blok et al. ............ | 92/162 R |
| 3,954,048 | 5/1976 | Houser ................ | 92/169.1 |
| 4,058,382 | 1/1989 | Bremer et al. | |
| 4,697,113 | 9/1987 | Young . | |
| 4,799,421 | 11/1987 | Mulder . | |
| 4,802,332 | 2/1989 | Beale ................ | 60/520 |
| 4,873,826 | 10/1989 | Dhar ................ | 60/520 |

FOREIGN PATENT DOCUMENTS

| | | | |
|---|---|---|---|
| 981711 | 12/1982 | U.S.S.R. ............ | 92/162 R |
| 472999 | 10/1937 | United Kingdom ............ | 92/162 R |

OTHER PUBLICATIONS

Proceedings of the Twelfth International Cryogenic Engineering Conference Southampton, UK Jul. 12-15, 1988.

*Primary Examiner*—Edward K. Look
*Assistant Examiner*—Thomas Denion
*Attorney, Agent, or Firm*—Brian J. Wieghaus

[57] ABSTRACT

A piston engine comprising a piston movable in a recriprocating manner in a cylinder, while during operation a wedge-shaped gap is present between piston and cylinder. The piston divides the cylinder into a first chamber and a second chamber, which communicate with each other through the gap. A stable central position of the piston is obtained by means of the wedge-shaped gap, which mainly determines a pressure difference between the first chamber and the second chamber. A particular application of the piston engine is a cryocooler, by means of which, for example, processors of computers are cooled.

21 Claims, 4 Drawing Sheets

PISTON ENGINE

BACKGROUND OF THE INVENTION

The invention relates to a piston engine comprising at least one piston which is movable in a reciprocating manner in a gas-filled cylinder and divides the cylinder into a first chamber and a second chamber, while during operation a gap is provided between an outer wall of the piston and an inner wall of the cylinder, which gap communicates the first chamber with the second chamber and is different in size in annular cross-section transverse to the direction of movement of the piston.

In a known (see Proceedings 12th International Cryogenic Engineering Conference, Southampton, United Kingdom, July 1988) piston engine of the kind mentioned in the opening paragraph, it is found that both with an annular circular-cylindrical gap and with an annular wedge-shaped gap between piston and cylinder a change in the central position of the piston occurs due to an inequality between the mass flows (kg per machine cycle) of the gas moving in one direction through the gap and of the gas moving in the opposite direction through the gap. The said inequality results in that the piston is subjected to a force which is oppositely directed to the direction of the larger mass flow of the relevant mass flows. Thus, in order to obtain with a reciprocating piston not mechanically coupled to a drive (a so-called free piston) a constant and stable central position, the piston must be subjected to a compensation force which is related to the force due to the difference in mass flows. In general, this leads to a comparatively expensive piston engine, the more so as the force caused by the displacement and the instability of the central position is not constant, or fixed, under practical conditions.

SUMMARY OF THE INVENTION

The invention has for its object to provide a piston engine in which a constant central position of the piston is obtained without the use of special means being required to this end.

The piston engine according to the invention is for this purpose characterized in that the gap on either side of a reversing plane transverse to the direction of movement of the piston has the shape of a wedge, while a cross-section of the gap located near a first boundary plane of the gap and a cross-section of the gap located near a second boundary plane of the gap have a smaller surface area than a cross-section of the gap near the reversing plane and a pressure difference existing between the first and the second chamber is substantially determined by the pressure difference across the gap between the first and the second boundary plane, the wedge-shaped form of the gap extending on either side thereof beyond the boundary planes of the gap over a distance at least equal to half a piston stroke in the central position of the piston.

It has been found that the desired central position of a free piston is stable when the net mass flow (also designated as the piston leak) in the gap per machine cycle is a given function of the central position of the piston. If for any reason the central position of the piston should be displaced in a given direction, a piston leak should occur in this direction. It has been found that the said function is present with a concave-shaped gap so that a central position is obtained which is stabilized in itself and constant. In the desired central position, a piston leak no longer occurs.

It should be noted that the term "reversing plane" is to be understood to mean a geometric plane which is transverse to the direction of movement of the piston at the area at which the cross-section of the gap gradually decreases on either side of said plane.

A particular embodiment of the piston engine, in which the concave-shaped gap can be obtained in a comparatively simple manner, is characterized in that a wedgeshaped gap on one side as well as on the other side of the reversing plane is located between a conical inner wall of the cylinder and a circular-cylindrical outer wall of the piston.

A further embodiment of the piston engine, which is particularly suitable with difference in volume between the first and the second chamber, is characterized in that, measured in a direction perpendicular to the reversing plane, the length of the part of the gap located on one side of the reversing plane differs from the length of the part of the gap located on the other side of the reversing plane in a central position of the piston.

A still further embodiment of the piston engine, in which the piston can perform simultaneously with a translation also a rotation, is characterized in that the piston is provided near its two ends with a dynamic groove bearing, while the cylinder is provided on either side of the reversing plane and between the groove bearings with an annular groove connected on the one hand to the gap near the boundary planes thereof and on the other hand to a communication duct merging into a pressure equalization chamber on one side and the other side, respectively, of the piston.

A particular piston engine in the form of a cryo-cooler is characterized in that the cylinder comprises two pistons which are identical, move in operation substantially 180° out of phase and enclose a compression space, which is connected through a regenerator to an expansion space, in which a displacer is displaceable, a gap being provided between each of the pistons and the cylinder, which gap extends on either side of a reversing plane transverse to the direction of movement of the piston in the form of a wedge and in converging manner.

It should be noted that U.S. Pat. No. 4,058,382 discloses a hot-gas piston engine having a constant and stable central position of the piston. The constant central position is obtained here by means of a duct between a working space and a buffer space, which is opened by the piston at given instants in the machine cycle. The opened duct causes a so-called dead volume which is disadvantageous for the efficiency of the piston engine.

Further, U.S. Pat. No. 4,697,113 discloses a piston engine operating as a cryo-cooler having two pistons which perform movements shifted in phase by 180°. Between each of the pistons and a magnetically conducting core, a double-conical gap is provided, the purpose of which is not mentioned. The shape of this double-conical gap is opposite to that in the piston engine according to the invention, however, and according to the insight on which the invention is based it would therefore lead to an unstable piston movement with a non-constant and unstable central position of the piston.

Finally, the international patent application PCT/U.S. 87/01920 published on Feb. 11, 1988 under the international publication number WO 88/01036 discloses a piston engine having a ton-shaped piston. The same remarks apply to this piston engine as to the piston engine according to U.S. Pat. No. 4,697,113.

BRIEF DESCRIPTION OF THE DRAWINGS

The invention will be described more fully with reference to the drawing, in which.

DESCRIPTION OF THE PREFERRED EMBODIMENTS

Figure 1:
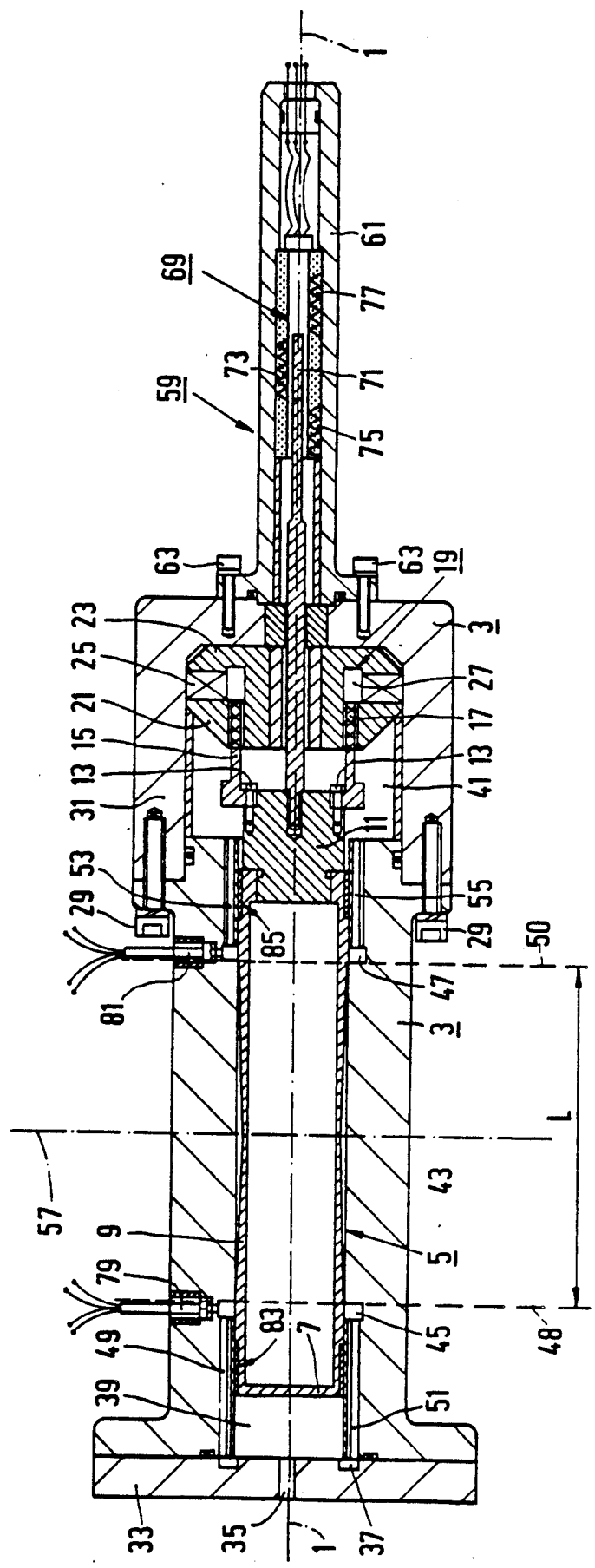
FIG. 1 is a longitudinal sectional view of a first embodiment of a piston engine having a single stabilized piston.

The first embodiment of the piston engine shown in FIG. 1 comprises a piston 5, which is movable parallel to a center line 1 in a cylinder 3 in a reciprocating manner. The piston is composed of a pipe 9 provided on one side with a bottom 7 and a block 11 screwed into the pipe 9 opposite to the bottom 7. By means of bolts 13, a support cylinder 15 for an electric coil 17 is secured to the block 11. The coil 17 forms part of a translation motor 19, further comprised of a yoke part 21 and a yoke part 23. A fixedly arranged axially magnetized permanent ring magnet 25 is arranged between the fixedly arranged yoke parts 21 and 23. The coil 17 is displaceable in an annular gap 27 between the yoke parts 21, 23 and the permanent magnet 25.

By means of bolts 25, a cup-shaped circular-cylindrical cover 31 is screwed to the cylinder 3. Within the cover 31, the translation motor 19 is arranged. On the side remote from the cover 31, a diskshaped plate 33 having an opening 35 and an annular duct 37 is screwed on the cylinder 3. A first gas-filled chamber 39 is located on the lefthand side of the piston 5, while a gas-filled second chamber 41 is located on the righthand side of the piston 5. A suitable gas is, for example, helium gas. It should be noted that the cover 31 is considered to form part of the cylinder 3 so that it is divided by the piston 5 into the first chamber or compression space 39 and the second chamber 41.

Between the outer wall of the piston 5 and the inner wall of the cylinder 3 is provided a gap 43 communicating the chamber 39 with the chamber 41 and filled with the same gas as the chambers 39 and 41. The gap 43 comprises means for causing a leakage of working fluid across the piston in the direction of movement of the piston equilibrium position. The cylinder 3 is provided with two annular ducts 45 and 47 merging into the gap 43 and at the same time bounding this gap. The effective part of the gap 43 is bounded at the boundary planes 48 and 50 transverse to the direction of movement of the piston at the area of the annular ducts 45 and 47. The wedge-shaped form of the gap 43 extends on either side thereof over a distance which is at least equal to half the piston stroke in the central position of the piston. The annular duct 45 is connected through axial ducts 49 and 51 to the annular duct 37 in the plate 33 communicating with the first chamber or pressure equalization chamber 39, while the annular duct 47 is connected through axial ducts 53 and 55 to the second chamber or pressure equalization chamber 41. Pressure equalization takes place in the gap spaces between cylinder and piston on the lefthand side of the boundary plane 48 and on the righthand side of the boundary plane 50. Due to this pressure equalization, the condition is fulfilled that the pressure difference between the first chamber 39 and the second chamber 41 is substantially determined by the pressure difference across the gap 43 between the boundary planes 48 and 50. A lead can be connected to the opening 35 and this lead extends to an expansion part of a so-called cryo-cooler, as will be described more fully hereinafter with reference to FIGS. 2-4. The plate 33 may also be replaced by a plate provided with a delivery valve and a suction valve. In this case, a piston engine acting as a compressor is concerned.

On either side of a reversing plane or kink plane arranged perpendicular to the center line 1, connected to the piston and indicated in FIG. 1 by a dot-and-dash line 57, the gap 43 has the form of a wedge, which is symmetrical in the central or neutral position shown of the piston 5 with respect to the line 57 when the volumes of the first chamber 39 and the second chamber 41 are equal. It should be noted that, although the gap 43 is annular, this need not mean that in each cross-section perpendicular to the center line 1 the gap width is constant. This is especially not the case, for example, due to the action of the force of gravity with a horizontally arranged piston 5. In the piston engine of FIG. 1, the gap 43 is not only wedge-shaped, but also conical. This form is obtained by a double-conical shape of the piston 5 between and beyond the annular ducts 45 and 47. In each position of the piston 5, the conical shape must extend beyond the boundary planes 48 and 50 of the gap 43 because a fluctuating average flow resistance of the gap is necessary. The central wall of the cylinder 3 has a circular-cylindrical form. In the absence of a wedge-shaped gap, the piston 5 is subjected, due to the difference between the mass flow from the right to the left through the gap and the mass flow from the left to the right through the gap, per machine cycle to a force in the direction opposite to the direction of the larger of the two mass flows, or in other words: opposite to the direction of the so-called piston leak.

The parameters determining the extent and the direction of the piston leak per machine cycle are inter alia:

the difference between the volumes of the first chamber 39 and the second chamber 41, the difference between the phase of each of the pressure fluctuations on either side of the piston 5 and the phase of the piston movement, the stroke volume of the piston, the frequency of the piston movement, the difference between the average pressures on either side of the piston 5.

It should be noted that the term "machine cycle" is to be understood to mean a period of time elapsing during a complete reciprocating movement of the piston in a state of equilibrium. It has been found that in each combination of the five parameters mentioned above, a concave-shaped form of the gap 43 can be found which prevents a displacement of the piston from the desired central position. The dimensions of the gap can be determined by experiments and calculations based on the insight that by the shape of the gap 43 a net mass flow or piston leak per machine cycle must be produced in the direction of the displacement of the central position that would take place in the absence of a wedge form.

It has been found that the stabilizing effect of the concave-shaped gap 43 can be demonstrated by adding to the alternating current for energization of the coil 17 of the translation motor 19 a direct current component which changes the central position of the piston 5 and by then observing what happens when the direct current component is removed again. For this purpose, the piston engine shown in FIG. 1 is provided with an inductive position sensor 59. The latter has a pipe-shaped housing 61 which is secured by bolts 63 to the cover 31. A steel pin 65 forming part of the position sensor 59 and screwed into the metal block 11 is passed through an opening 67 of the cover 31 and is provided at an end located within the holder 61 and surrounded by a coil system 69 with a soft-iron core 71 subjected to the same displacement as the piston 5. A control coil 73 of the coil system 69 is energized with a high-frequency control current so that an alternating current is induced in two induction coils 75 and 77. Displacement of the core leads to a variation of the induction currents in the coils 75 and 77, which is a measure for the position of the piston 5.

A starting situation is assumed in which the pressure in the chambers 39 and 41 is equal and in which no external pressure fluctuation is admitted through the opening 35. By adding a direct current component to the alternating current by which the coil 17 of the translation motor 19 is energized and by then removing this component again after some time, it can be ascertained by the position sensor 59 what is the reaction of the piston on a change of the central position with respect to the original central position (neutral position) indicated by the line 57. After a displacement of the central position caused by the direct current component, a difference in average pressure proves to occur between the first chamber 39 and the second chamber 41. This is detected by a pressure sensor 79 at the lefthand boundary plane of the gap 43 and by a pressure sensor 81 at the righthand boundary plane thereof. The pressure sensors 79 and 81 are connected to the annular ducts 45 and 47, respectively. After the direct current component has been removed from the energizing current of the translation motor 19, the piston 5 returns to its original central position at the area of the line 57. At the instant of return, the average pressures on either side of the piston 5 measured by the pressure sensors 79 and 81 are equal again. The force which caused the piston 5 to return to its original central position was supplied by the pressure difference across the piston produced by the displacement of the central position. Thus, the original central position is found to be a stable position.

It has been found that, when in the same manner as already described direct current components of different values are added to the energizing current of the translation motor 19 and when these direct current components are maintained, new stable and constant central positions are obtained. This means that deviations from the desired central position due to manufacturing tolerances or influences of the gravity force can be compensated for by means of a direct current component adjusted for one time in the energizing current.

In the piston engine shown in FIG. 1, the piston 5 can be provided at the ends of the pipe 9 with spiral groove bearings 83 and 85 for an optimum centering of the piston 5 in the cylinder 3. The rotation motor required for this purpose may be of the kind described in European Patent Application No. EP-A1-0223288 which corresponds to U.S. Pat. No. 4,799,421. The axial ducts (49, 51) and (53, 55) serve in this case at the same time for pressure equalization across the spiral groove bearings 83 and 85. The axial position of the annular ducts 45 and 47 determines not only the length over which pressure equalization takes place, but also the effective length of the stabilization gap 43 indicated in FIG. 1 by a letter L. The wedge-shaped and conical gap 43 can be obtained, as in the engine shown in FIG. 1, by means of a circularcylindrical inner wall of the cylinder and a conical piston, but also by means of a circular-cylindrical piston and a conical inner wall of the cylinder. Such a sleeve-shaped cylinder can be manufactured without a machining operation by subjecting the cylinder internally to gas pressure in a jig. A chamber in the cylinder 3 may also be used as a jig for a cylinder lining, which is shaped into the desired wedge form by means of gas pressure. Pressure equalization can now be obtained by annular ducts in the piston, which are connected through axial ducts to the first and the second pressure equalization chamber.

Figure 2:
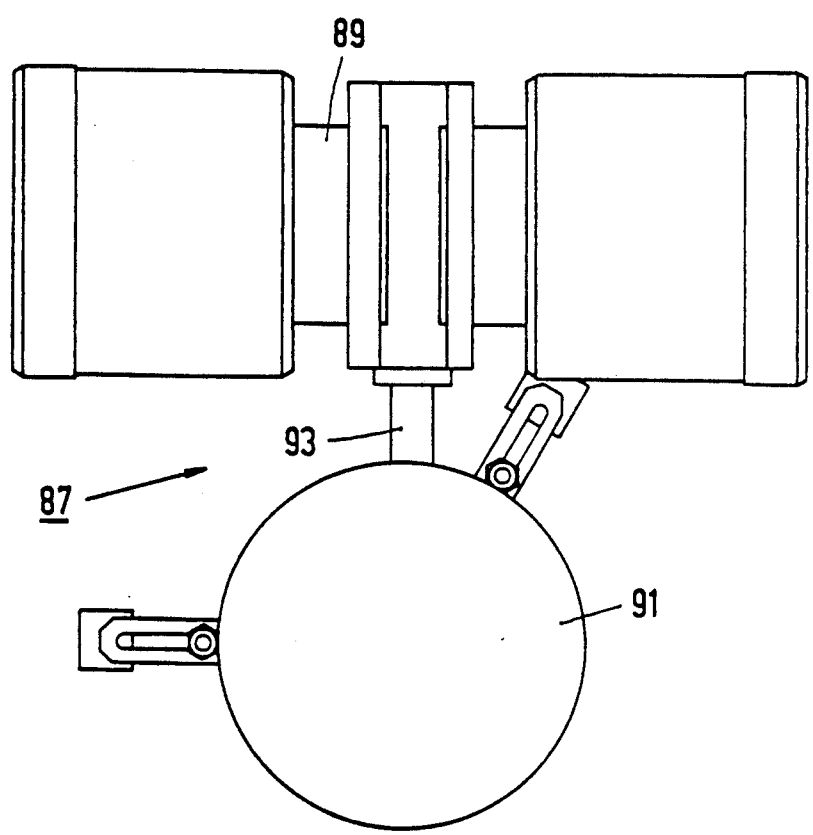
FIG. 2 is a plan view of a second embodiment of a piston engine having three stabilized pistons.
Figure 3:
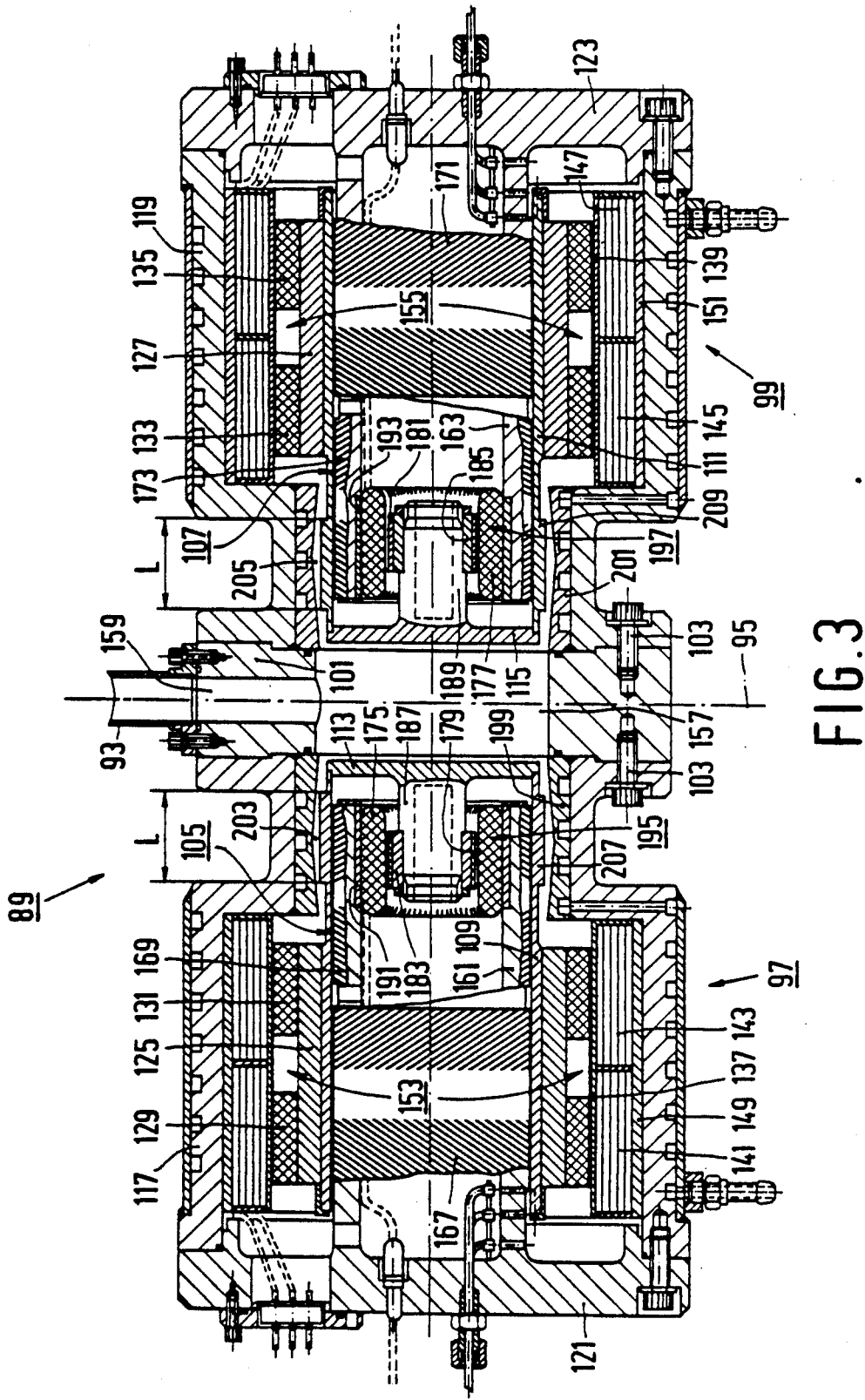
FIG. 3 is a longitudinal sectional view of a compression part of the piston engine shown in FIG. 2.
Figure 4:
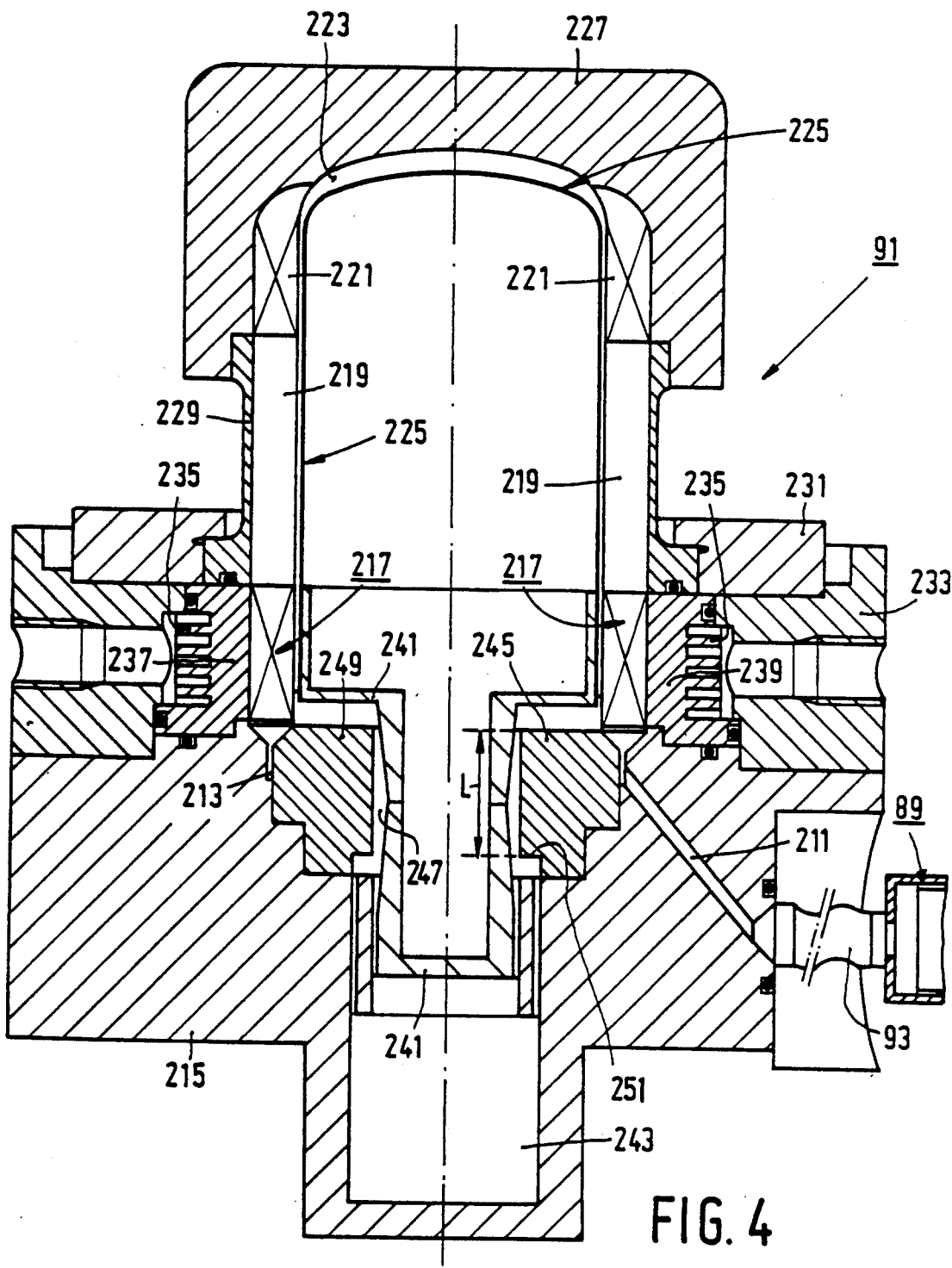
FIG. 4 is a longitudinal sectional view of an expansion view of the piston engine shown in FIG. 2.

The second embodiment shown in FIGS. 2 to 4 of the piston engine according to the invention relates to a so-called cryo-cooler 87 with free pistons. The complete cryo-cooler 87 shown in FIG. 2 has a compression part 89 and an expansion part 91 coupled to each other through a pipe 93. The compression part 89 shown in FIG. 3 is symmetrical with respect to a line 95, on both sides of which a piston engine is present operating according to the principle described with reference to FIG. 1, i.e. a piston engine 97 and a piston engine 99. The piston engine 97 and 99 are coupled to each other by means of a connection ring 101 and bolts 103. In the two piston engines 97 and 99, pistons 105 and 107, respectively, are provided, which can move in a reciprocating manner and are composed of circular-cylindrical tubes (109, 111) and bottoms 113, 115 connected thereto. The pistons 105, 107 are arranged in housings 117 and 119, respectively, which are closed by covers 121, 123. Circular-cylindrical sleeves 125, 127 of, for example, cobalt iron are secured on the pistons 105, 107. Each of the sleeves 125, 127 serves as a support for two annular permanent magnets 129, 131 and 133, 135, respectively, of, for example, samarium cobalt. The permanent magnets 129, 131 and 133, 135 are freely displaceable along the circular-cylindrical inner wall of coil formers 137 and 139, respectively, on which coils 141, 143 and coils 145, 147 are secured, which are enclosed in sleeves 149, 151 of, for example, cobalt iron. The two assemblies constituted by the sleeves 125, 127, the radially magnetized permanent magnets 129, 131, 133, 135, the coils 141, 143, 145, 147 and the sleeves 149, 151 act as translation motors 153, 155 of the brushless direct current type for the translatory movement of the pistons 105, 107.

Between the bottoms 113 and 115 of the pistons 105 and 107 is present a compression space 157, which is filled with a gaseous working medium, such as, for example, helium. The compression space 157 is connected by means of the pipe 93 to the expansion part 91 of the cryo-cooler already mentioned and shown in FIG. 4. The connection ring 101 is provided with a radial duct 159 connected to the pipe 93. The covers (121, 123) are provided with circular-cylindrical mandrels in the form of circular guides 161 and 163, respectively, for the pistons 105, 107. The guides 161, 163 are concentrically arranged with respect to the pistons 105, 107. The center lines of the pistons 105, 107 and the guides (161, 163) substantially coincide with a center lie 165 of the compression part 89 of the cryo-cooler 87. On the circular-cylindrical outer surfaces of the guides 161, 163 are disposed herringbone-shaped groove patterns 167, 169 and 171, 173, respectively, which constitute radially acting pairs of dynamic groove bearings. The guides (161, 163) in the form of a fixedly arranged mandrel passed into the pistons (105, 107) carry fixedly arranged coils (175, 177) near their ends facing the bottoms (113, 115). Within the coils (175, 177) annular radially magnetized permanent magnets (179, 181) of samarium cobalt are disposed, which are secured through cobalt iron rings (183, 185) on tube-shaped supports 187, 189, which are integral with the bottoms 113, 115. The coils (175, 177) are enclosed in cobalt iron sleeves (191, 193). The two assemblies constituted by the sleeves (191, 193), the coils (175, 177), the multiple permanent magnets (179, 181) and the rings (183, 185) act as rotation motors (195, 197) of the brushless direct current type for the rotary movement of the pistons (105, 107), which is required to obtain a radial dynamic gas bearing at the area of the groove patterns (167, 169, 171, 173).

On the inner wall of the housings (117, 119), bushings (199, 201) are secured, along whose inner wall the pistons (105, 107) are freely displaceable. Between the bushings (199, 201) and the pistons (105, 107) are disposed wedge-shaped or conical gaps 203, 205 of the same kind as the gap 43 in the piston engine shown in FIG. 1. The gaps (203, 205) separate the compression space 157 from the dynamic groove bearings (167, 171). Also in the compression part 89 described of the cryocooler 87 comprising two pistons 105, 107 performing in operation movements shifted in phase by 180°, the gaps (203, 205) prevent a displacement of the central position of the piston 105 and/or the piston 107. The annular gaps (203, 205) are formed by a kinked double-conical widening of the bushings (199, 201), while the axial length L of the gaps (203, 205) is obtained by ridges (207, 209) having a length L in the wall of the pistons (105, 107).

As stated, the compression part 89 of the cryo-cooler 87 is connected through a pipe 93 to the expansion part 91. The pipe 93 is connected via a channel 211 and a further annular channel 213 in a housing 215 to a cooler 217, a regenerator 219, a freezer 221 and an expansion space 223 above a substantially circular-cylindrical displacer 225. The expansion space 223 is closed on the upper side by a cover 227, which is soldered to a pipe 229. On its lower side, the pipe 229 is screwed into a ring 231, which is secured by bolts to a holder 233 for a heat exchanger 235, which forms part of the cooler 217. The holder 233 is provided with ducts 237 and 239 for supply and discharge of a cooling liquid. The holder 233 is secured by bolts to the housing 215. Since the pressure surface exposed to the working medium of fluctuating pressure is different on the upper and the lower side of the displacer 225 due to the presence of a pipe-shaped prolongation 241 reaching into a gas spring space 243, in which the average pressure prevails, an individual driving motor for the displacer 225 may be dispensed with. Such a driving motor is desirable, however, under given circumstances. In this case, an electrical translation motor may be used at the area of the prolongation 241. Between the pipe-shaped prolongation 241 and an abutment or limiting ring 245 mounted in the housing is provided a wedge-shaped or double-conical gap 247 having the same function as the gaps 43 (FIG. 1) and 203 (FIG. 2) already described above. The length L of the gap 247 is obtained by an annular part 249 having a length L of the ring 245, which is formed by providing a shoulder 251. In the manner described, a cryo-cooler 87 is obtained comprising three pistons stabilized by wedge-shaped gaps (the displacer 225 is considered to be a piston).

In a particular embodiment of the piston engine, the length of the part of the gap located on one side of the reversing plane differs from the length of the part of the gap located on the other side of the reversing plane. The said lengths are measured in a direction perpendicular to the reversing plane. In order to avoid repetitions as far as possible, a piston engine with such a gap is not shown in the drawing. Due to the difference in length of the gap parts, an additional force is exerted on the piston, by which the influence of the force of gravity with a vertically arranged piston can be compensated for. Such an additional force may also be obtained in that with the same length of the said gap parts the conicity on either side of the reversing plane is chosen to be different.

It should be noted that in the piston engine shown in FIG. 1 the first chamber 39 and the second chamber 41 act as pressure equalization chambers for the spiral groove bearings 83 and 85. Without pressure equalization across the spiral groove bearings 83 and 85 by means of the axial ducts (49, 51, 53, 55) and the annular ducts 45 and 47 connected to the gap 43, the bearings would not act optimally.

In the second embodiment of the piston engine shown in FIGS. 2 to 4, the compression space 157 acts as the first chamber for both pistons 105 and 107, while the spaces on the other side of the gaps 203 and 205 act as the second chamber. In general, the volume of the second chamber is such that the so-called average pressure prevailing therein substantially does not fluctuate so that this chamber acts as a buffer chamber. The wedge-shaped converging gaps 43, 203 and 205 otherwise do not lose their stabilizing property when pressure fluctuations occur on either side of the pistons. Gaseous working medium is also pumped to that side of the piston on which a displacement of the central position occurs in those conditions in which no buffer chamber is present on one of the piston sides.

Besides the conical gaps described, many kinds of other wedge-shaped gaps are possible as long as the condition is fulfilled that the size of the surface area of a cross-section of the gap decreases from the reversing plane to the two boundary planes of the gap and the average flow resistance of the effective part of the gap is operative during the piston movement. Therefore, the gap converges to its both ends. Cup-shaped gaps without a sharp kink at the area of the reversing plane are therefore also possible. Instead of spiral groove bearings for centering the piston in the cylinder, ceramic bush or sliding bearings may be used. which are secured on the piston near the two ends.

In a piston engine shown in FIG. 1, the gap length (L) amounted to 110 mm, the maximum diameter of the piston was 35 mm, the minimum gap width was 15 $\mu$m and the maximum gap width at the area of the reversing plane as 30 $\mu$m. The gap width in the spiral groove bearings is 9 $\mu$m and that in substituting bush or sliding bearings is 5 to 10 $\mu$m. In case pressure equalization without annular ducts and axial ducts is desired, the gap width on the lefthand side and on the righthand side of the boundary surfaces 48 and 50 must be at least 1 mm.

Finally, it should be noted that pressure equalization or, in other words, a smallest possible pressure gradient across the gap parts on the lefthand side and on the righthand side of the effective part L of the gap, may also be obtained by a connection of these gap parts with chambers other than the first and second chambers. In these other chambers, the working pressures of the first and the second chamber, respectively, must then prevail.

We claim:

1. An apparatus comprising a piston which is reciprocable in a gas-filled cylinder and divides the cylinder into a first chamber and a second chamber, between which chambers a gas pressure difference exists during piston reciprocation, the outer wall of the piston and an inner wall of the cylinder defining a gap therebetween which gap communicates the first chamber with the second chamber and is different in size in annular cross-sections transverse to the direction of movement of the piston, characterized in that:

The gap is concave and on either side of a reversing plane transverse to the direction of movement of the piston the gap is tapered such that a cross-section of the gap located near a first boundary plane of the gap and a cross-section of the gap located near a second boundary plane of the gap have a smaller surface area than a cross-section of the gap near the reversing plane of the gap, and the pressure difference across the gap between the first and the second boundary plane is substantially equal to the pressure difference between the first and second chambers, the tapered form of the gap extending on either side thereof beyond the boundary planes of the gap over a distance at least equal to half a piston stroke in the central position of the piston.

2. An apparatus as claimed in claim 1, characterized in that the tapered gaps on both sides of the reversing plane are located between a conical inner wall of the cylinder and a circular-cylindrical outer wall of the piston.

3. An apparatus as claimed in claim 2, characterized in that, measured in a direction perpendicular to the reversing plane, the length of the part of the gap located on one side of the reversing plane differs from the length of the part of the gap located on the other side of the reversing plane in the central position of the piston.

4. An apparatus as claimed in claim 2, characterized in that the piston is provided near its two ends with a pattern of grooves for forming a dynamic groove bearing with the cylinder, and the cylinder further comprising an annular groove on either side of the reversing plane and between the groove bearings, said annular groove being connected to the gap near the respective boundary plane and to a communication duct merging into a pressure chamber on the respective side of the piston.

5. An apparatus as claimed in claim 4, further comprising an expansion chamber, a displacer displaceable in said expansion chamber, and regenerator connected to said expansion chamber, characterized in that: the cylinder comprises two pistons which are identical, move in operation substantially 180° out of phase and enclose between them a compression space, the compression space being connected through the regenerator to the expansion chamber, a gap being provided between each of the pistons and the cylinder, each gap extending on either side of a reversing plane of the respective gap transverse to the direction of movement of the piston in the form of a wedge and in a converging manner.

6. An apparatus as claimed in claim 1, characterized in that, measured in a direction perpendicular to the reversing plane, the length of the part of the gap located on one side of the reversing plane differs from the length of the part of the gap located on the other side of the reversing plane in the central position of the piston.

7. An apparatus as claimed in claim 1, characterized in that the piston is provided near its two ends with a pattern of grooves for forming a dynamic groove bearing with the cylinder, and the cylinder further comprising an annular groove on either side of the reversing plane and between the groove bearings, said annular groove being connected to the gap near the respective boundary plane and to a communication duct merging into a pressure chamber on the respective side of the piston. plane of the respective gap 8. An apparatus as claimed in claim 7, further comprising an expansion chamber, a displacer displaceable in said expansion chamber, and regenerator connected to said expansion chamber, characterized in that: the cylinder comprises two pistons which are identical, move in operation substantially 180° out of phase and enclose between them a compression space, the compression space being connected through the regenerator to the expansion chamber, a gap being provided between each of the pistons and the cylinder, each gap extending on either side of a reversing plane transverse to the direction of movement of the piston in the form of a wedge and in a converging manner.

9. An apparatus as claimed in claim 3, further comprising an expansion chamber, a displacer displaceable in said expansion chamber, and regenerator connected to said expansion chamber, characterized in that: the cylinder comprises two pistons which are identical, move in operation substantially 180° out of phase and enclose between them a compression space, the compression space being connected through the regenerator to the expansion chamber, a gap being provided between each of the pistons and the cylinder, each gap extending on either side of a reversing plane of the respective gap transverse to the direction of movement of the piston in the form of a wedge and in a converging manner.

10. An apparatus as claimed in claim 2, further comprising an expansion chamber, a displacer displaceable in said expansion chamber, and regenerator connected to said expansion chamber, characterized in that: the cylinder comprises two pistons which are identical, move in operation substantially 180° out of phase and enclose between them a compression space, the compression space being connected through the regenerator to the expansion chamber, a gap being provided between each of the pistons and the cylinder, each gap extending on either side of a reversing plane of the respective gap transverse to the direction of movement of the piston in the form of a wedge and in a converging manner.

11. An apparatus as claimed in claim 1, further comprising an expansion chamber, a displacer displaceable in said expansion chamber, and regenerator connected to said expansion chamber, characterized in that: the cylinder comprises two pistons which are identical, move in operation substantially 180° out of phase and enclose between them a compression space, the compression space being connected through the regenerator to the expansion chamber, a gap being provided between each of the pistons and the cylinder, each gap extending on either side of a reversing plane of the respective gap transverse to the direction of movement of the piston in the form of a wedge and in a converging manner.

12. An apparatus as claimed in claim 2, characterized in that the cylinder comprises two pistons which are identical, move in operation substantially 180° out of phase and enclose a compression space, which is connected through a regenerator to an expansion space, in which a displacer is displaceable, a gap being provided between each of the pistons and the cylinder, which gap extends on either side of a reversing plane transverse to the direction of movement of the piston in the form of a wedge and in a converging manner.

13. An apparatus as claimed in claim 1, wherein the tapered gaps on each side of the reversing plane have a linear taper.

14. An apparatus as claimed in claim 2, wherein the tapered gaps on each side of the reversing plane have a linear taper.

15. An apparatus as claimed in claim 3, wherein the tapered gaps on each side of the reversing plane have a linear taper.

16. An apparatus comprising:
a cylinder having a cylinder wall defining a cylinder axis and having a working fluid;
a free piston having an outer wall and reciprocable in said cylinder, a fluid pressure difference existing across said piston during piston reciprocation, said piston having a clearance fit with said cylinder forming a leakage path between said piston outer wall and said cylinder wall allowing leakage of working fluid across the piston during piston reciprocation, the fluid pressure difference causing an inequality in the mass flow of the working fluid in opposite directions per reciprocation cycle causing the position equilibrium piston to shift from a fixed cylinder position, the improvement comprising:
the geometry of the piston outer wall and cylinder inner wall comprising means for causing a leakage of working fluid across the piston in the direction of movement of the position equilibrium piston for equalizing the mass flow of the working fluid and restoring the position equilibrium piston to the fixed cylinder position during each reciprocation cycle.

17. An apparatus as claimed in claim 16, wherein said piston outer wall and said cylinder wall form a concave gap in which the cross-sectional area of the gap transverse to the cylinder axis decreases in the direction of the gap ends from a reversing plane of the gap located between the gap ends.

18. An apparatus as claimed in claim 17, wherein said cylinder wall is circular cylindrical and said piston wall has a conical shape on either side of the reversing plane.

19. An apparatus as claimed in claim 18, wherein the length of the gap on one side of the reversing plane is greater than the length of the gap on the other side of the reversing plane.

20. An apparatus as claimed in claim 17, wherein the length of the gap on one side of the reversing plane is greater than the length of the gap on the other side of the reversing plane.

21. An apparatus as claimed in claim 17, wherein the tapered gaps on each side of the reversing plane have a linear taper.

* * * * *